United States Patent [19]

Atkinson et al.

[11] 3,721,501
[45] March 20, 1973

[54] METHOD AND APPARATUS FOR MONITORING SURFACE COATINGS

[75] Inventors: Everett J. Atkinson; James R. Sager, both of Toledo, Ohio; Alan C. Bensch, Lowell, Mass.

[73] Assignee: Owens-Illinois, Inc., Toledo, Ohio

[22] Filed: Jan. 4, 1971

[21] Appl. No.: 103,566

[52] U.S. Cl. .................356/201, 23/230, 209/111.5, 250/223
[51] Int. Cl.......G01n 21/06, G01n 31/00, B07c 5/34
[58] Field of Search..............356/186, 201, 239, 240; 250/223

[56] References Cited

UNITED STATES PATENTS

| | | | |
|---|---|---|---|
| 2,593,311 | 4/1952 | Johnson et al. | 356/240 |
| 3,351,198 | 11/1967 | Wyman | 356/240 X |
| 3,328,587 | 6/1967 | Brown et al. | 356/186 |
| 3,432,243 | 3/1969 | Hardesty | 356/176 |
| 2,282,741 | 5/1942 | Parker | 356/186 X |
| 2,483,876 | 10/1949 | Boyer | 356/186 X |
| 2,562,901 | 8/1951 | Fischer | 356/186 X |
| 2,915,938 | 12/1959 | Hughes | 356/186 |
| 3,283,898 | 11/1966 | Calhoun | 356/240 X |
| 3,349,906 | 10/1967 | Calhoun et al. | 336/240 X |
| 3,479,514 | 11/1969 | Kidwell | 336/240 X |
| 3,481,467 | 12/1969 | Wood | 356/240 X |
| 3,582,664 | 6/1971 | Hrdina | 356/186 A |
| 3,588,258 | 6/1971 | Sendt | 336/240 |

Primary Examiner—Ronald L. Wibert
Assistant Examiner—Conrad Clark
Attorney—D. T. Innis and E. J. Holler

[57] ABSTRACT

There is disclosed herein in a preferred embodiment a method and apparatus for determining whether the layer of high alkali glass on the inside of a glass bottle has been effectively neutralized by the introduction of an acidic compound into the interior of the glass bottle. The method includes the steps of passing a beam of light through the bottle, and filtering the light beam to pass only a range of wave lengths which will be scattered, absorbed or otherwise inhibited by the presence of a coating on the inside of the bottle which has resulted from the reaction of the acidic compound and the layer of high alkali glass. The filtered light beam is sensed to determine the amount of light in the range of wave lengths which passes through the bottle and this is utilized as a measure of the effectiveness of the neutralization process. In the preferred embodiment the filtering step includes limiting the range of wave lengths to detect the amount of sodium sulphate in the coating on the inside of the bottle as the measure of the effectiveness of the neutralization process.

9 Claims, 3 Drawing Figures

INVENTOR
EVERETT J. ATKINSON
ALAN C. BENSCH
JAMES R. SAGER
ATTORNEY

METHOD AND APPARATUS FOR MONITORING SURFACE COATINGS

BACKGROUND OF THE INVENTION

While the invention will be described specifically with respect to the measurement of coatings in glass containers and more specifically to the measurement of coatings resulting from a neutralization process, it will become apparent from the description that the invention is applicable to other processes for detecting coatings and coating thicknesses on glassware generally.

In the manufacture of certain glass aricles such as vaccine bottles or ampuls, various amounts of alkali which constitute a substantial portion of the glass composition, are brought to the surface of the glass either exposed or in close proximity to the exposed surface. This alkali may form a very thin layer of glass which has a higher alkali content than the normal glass. This thin layer is not as stable as the normal glass which is indicated by its greater leachability and chemical reactivity with certain reagents.

Aqueous solutions which are contained within glass bottles or ampuls for medicinal use have shown a marked tendency to leach out the alkali at or near the interior surfaces. This leaching may also occur when the open containers are stored in a humid atmosphere prior to filling. The leached alkali produces a cloudy film on the surfaces of empty glass containers reducing their transparency as an accelerated weathering effect. The thin alkaline layer is not sufficiently leachable to break down during the usual washing procedure prior to filling the containers. This layer decomposes later during sterilization or storage of the filled containers, occasionally within a relatively short period of time. The effect of the break down of this alkaline layer is to increase the alkalinity of the contained product to cause its discoloration or precipitation, to decrease potency or to increase toxicity beyond acceptable limits. The resultant alkalinity is sufficient to cause deleterious effects on pharmaceutical products such as stored drugs or water for injection so as to render them completely unusable.

Reducing the alkalinity of interior surfaces of glass containers has been accomplished in the past by several methods. Acidic gas has been used in blowing glass containers to reduce their internal surface alkalinity. The acidic gas reacts with the interior surfaces to neutralize the alkalinity of the thin layer of high alkali glass. Sulphur pellets have been employed to achieve this neutralization by dropping one such pellet into each container and heating to a predetermined temperature to react the acidic gases with the interior glass surfaces. When the glass containers have narrow necks or small mouths, such as ampuls, the containers have been treated by introducing an acidic gas into the ampul in a first zone and moisture introducing means into the ampul in a second zone, both zones being heated or the zones being located in an annealing lehr to furnish the required heat to react the acidic gases formed with the inner glass surfaces.

These neutralizing processes are discussed in more detail in U. S. Pat. No. 2,947,117. In the last process discussed above sulphurous acid is principally formed which reacts with the leachable alkali of the glass to form primarily alkali sulphites. THe presence of moisture produces a greater amount of solution of sulphurous acid which is convertible on heating. The transitory sulphurous acid reacts with atmospheric oxygen during the heating to form sulphuric acid. The action of the sulphurous acid on the leachable alkali forms alkali sulphates and sulphites on heating.

In any of the above processes when the containers are cooled from the heating operation, principally sulphates are visible on the inner surfaces as a cloudy bloom. The presence of the bloom indicates that the containers have been surface treated. The neutral salts, being very water soluble, are easily removed by water washing, either immediately following the treatment or prior to filling the containers. The usual washing processes common to the pharmaceutical industry, are satisfactory for removal of the bloom.

In the past the inspection of the treated containers for satisfactory surface treatment has been accomplished by an individual visually judging the bloom to determine whether the treatment is acceptable or not. However, the likelihood of possible contamination, reduction of potency, increase in toxicity, etc. have made it most desirable to determine more carefully whether such a surface treatment has, in fact, been effective.

Accordingly, it is an object of this invention to provide an improved method and apparatus for determining whether the layer of high alkali glass on the inside of the glass bottle has been effectively neutralized.

It is a further object of this invention to provide an improved method and apparatus for determining the presence, absence, or the thickness of a coating composition on glassware in general, and in glass containers particularly.

It is still a further object of this invention to provide an improved method and apparatus for producing an accept-reject signal for individual items of glassware to detect a surface coating on the glassware.

SUMMARY OF THE INVENTION

The above objects are carried out in a preferred embodiment for practicing the invention which features means for producing an accept-reject signal for individual items of glassware passing along a conveyor, particularly with respect to surface coatings of sodium sulphate such as are produced in sulphur treatment of glassware. A beam of light passes through the glassware to a photocell and produces a signal of variable amplification for adjustment purposes The beam of light may include a light chopper so that the signal rendered is a.c. rather than d.c. enabling the use of a less expensive a.c. amplifier. The presence of sodium sulphate gives a cloudy appearance to the glass surface which scatters and absorbs incident light to reduce the emergent light reaching the detector. The maximum effect is in the range of 0.35 to 0.50 microns, generally described as in the blue to near ultraviolet regions of the spectrum. The test is made more precise by elimination of incident light by the use of an infrared-absorbing filter and a blue-passing filter. By filtering, the cell is made sensitive primarily to the wave lengths most effected by the cloudy residue, and the reject point may be made accurately adjustable by a simple gain control adjustment on an electronic amplifier.

Other objects, advantages and features of this invention will become apparent when the following description is taken in conjunction with the accompanying drawings, in which.

DESCRIPTION OF THE PREFERRED EMBODIMENTS

Figure 1:
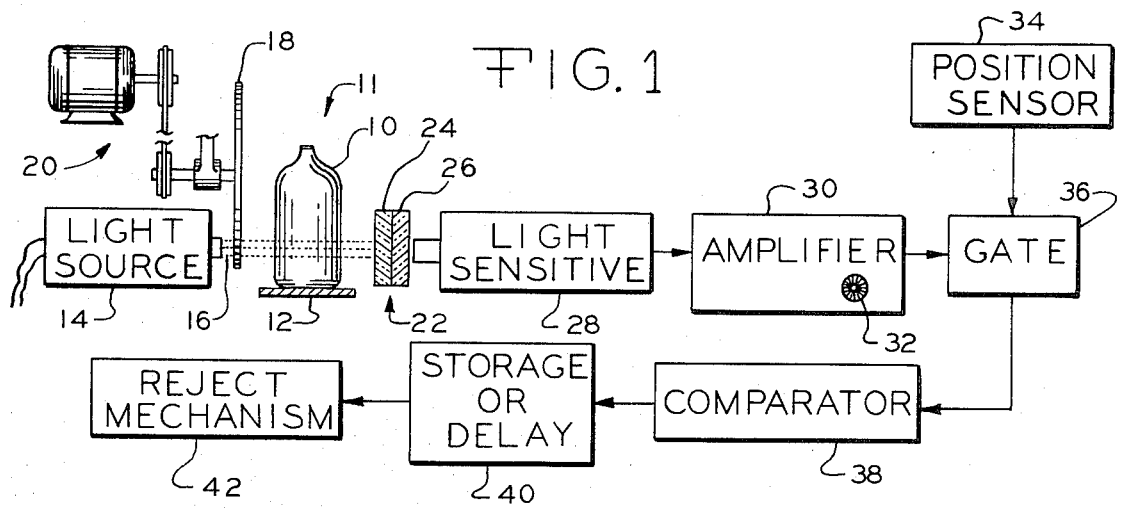
FIG. 1 is a diagrammatic illustration of an inspection station for glass bottles and the associated monitoring and measuring components.
Figure 2:
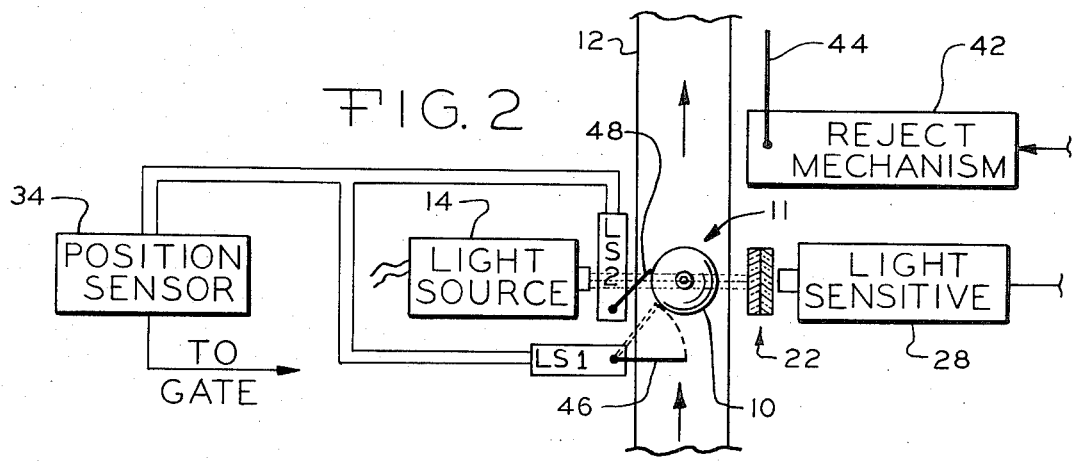
FIG. 2 is a partial plan view of the inspection station illustrated in FIG. 1 illustrating the container sensing and reject mechanism.

Referring to FIGS. 1 and 2 there is illustrated a novel combination of components to carry out the novel method of this invention.

A glass container 10 is shown passing through an inspection station generally designated at 11 on a conveyor 12 moving in the direction shown by the arrows thereon. A light source 14 is positioned on one side of the conveyor 12 at the inspection station 11 and provides a beam of light 16 across the conveyor 12 through a container 10 to be picked up by a light sensitive unit 28.

To enable the use of less expensive amplifying equipment, the light beam 16 may be chopped or supplied in a pulsating form. This may be accomplished by providing a light source which periodically interrupts the light beam in response to internal controls. The pulsating or chopped light beam may also be provided by a perforated or slotted disc 18 positioned between the light source 16 and the light pick-up unit 28. The disc 18 may be rotated by any suitable arrangement such as that noted generally at 20 as including a motor and pulley arrangement for driving a shaft on which the perforated or slotted disc 18 is mounted.

The filter designated generally at 22 advantageously includes two sections. An infrared-absorbing filter portion is noted at 24 and may be, for example, a Corning CS 1-69 infrared filter. The filter portion 26 may be a blue-passing filter, for example, a Corning CS 5-60 blue filter. The filter 22 thus limits the length of the light waves falling on the detection or light sensitive cell 28 to a range of about 0.35 to 0.50 microns, which will be noted hereinafter as the range of maximum absorption of sodium sulphate.

The light sensitive unit 28 provides an output signal in response to detection of light in the range passed by filter 22 with a magnitude proportional to the amount of light sensed in that range. The output signal is fed from the light sensitive unit 28 to an amplifier 30 to amplify the signal for later use. The amplifier 30 may have a gain control adjustment thereon, as diagrammatically designated by the knob 32, to raise or lower the amplitude of the signal issuing therefrom for use in a comparator 38 or for use in directly actuating a reject mechanism 42.

The output of the amplifier 30 is passed through a gate circuit 36. The gate circuit 36 is responsive to a signal received from a position sensor 34 which provides a signal to the gate circuit 36 when a bottle is in inspecting position at the inspection station 11.

Referring to FIG. 2 there is illustrated limit switches LS1 and LS2 having sensing fingers 46, 48, respectively. The sensing fingers 46, 48 are positioned so that contacts in the limit switches LS1 and LS2 close when the bottle 10 is in the preferred inspecting position. The preferred position enables the light beam 16 to pass through the container when the light beam is substantially normal to the side walls of the container, thus reducing reflective and refractive losses.

In the particular embodiment illustrated in FIG. 2, the limit switch LS1 has back contacts which are opened as long as the finger 46 is resting on or senses a bottle 10. When the bottle 10 passes out of the range of the finger 46, the finger swings from the position shown in dotted lines to that shown in solid lines and the back contacts of LS1 are closed. The limit switch LS2 has front contacts which are closed in response to a predetermined deflection of the finger 48.

As will be noted in FIG. 2, when a bottle 10 is at the desired position in the inspection station 11, the back contacts of limit switch LS1 are closed, while the front contacts of the limit switch LS2 are also closed in response to the deflection of the finger 48. THus, a sensing circuit is completed for the position sensor 34, enabling the position sensor to send a gating signal to the gate circuit 36.

It is to be noted that the position sensor unit 34 is illustrative only of a number of means suitable for indicating a desired position of the bottle 11, for example, photocell arrangements for detecting the position of the bottle 11.

The output from the gate circuit 36 may be supplied to a comparator unit 38. The comparator unit produces a regulated reference voltage proportional to a minimum thickness of coating which is acceptable for the bottles 10. When the signal from gate 36 exceeds the value of the reference voltage in comparator 38, the comparator circuit 38 will produce a reject signal to cause the reject mechanism 42 to operate an arm 44 to remove the bottle 10 from the conveyor 12 to be discarded or to be retreated.

A storage or delay unit 40 may be provided between the output of the comparator and the input of the reject mechanism 42 to enable the positioning of the reject mechanism at any point along the conveyor with respect to the inspection station 11, and yet provide for operation of the reject mechanism when an unacceptable bottle reaches the reject station or position. In the event that the inspection line is shut down, the storage unit may retain a reject signal to operate the reject mechanism when the line is put in operation again.

Since a proper coating may be highly critical if the later use of an unacceptable bottle would result in a decrease in potency or an increase in toxicity of the solution stored therein, a fail-safe circuit operation can be provided. For example the comparator 38 may provide an output at all times to the reject mechanism 42 so that the reject mechanism is always energized to reject bottles, unless the comparator receives a signal below the reference voltage value therein. Alternatively, the reject mechanism 42 may be always energized to reject containers unless an inhibit signal is received from the comparator 38, indicating that the bottle is acceptable.

As noted hereinbefore glassware undergoing a neutralization process will usually have a reaction product resulting from the process which provides a coating on the glassware. The presence or absence of the coating may be detected and the thickness of the coating may be detected by the method noted hereinbefore. To illustrate this concept sulphur treated ware has been chosen as an example. The sulphur treated ware leaves a cloudy white residue of sodium sulphate on the surface of the container. The sodium sulphate coating may be on the inside surface only, or both the inside and outside surfaces. The shorter wave lengths of light are absorbed by the sodium sulphate. These are the wave lengths in the blues, greens, violets, and ultraviolet. The longer wave lengths, toward the infrared end of the spectrum, are absorbed less.

Figure 3:
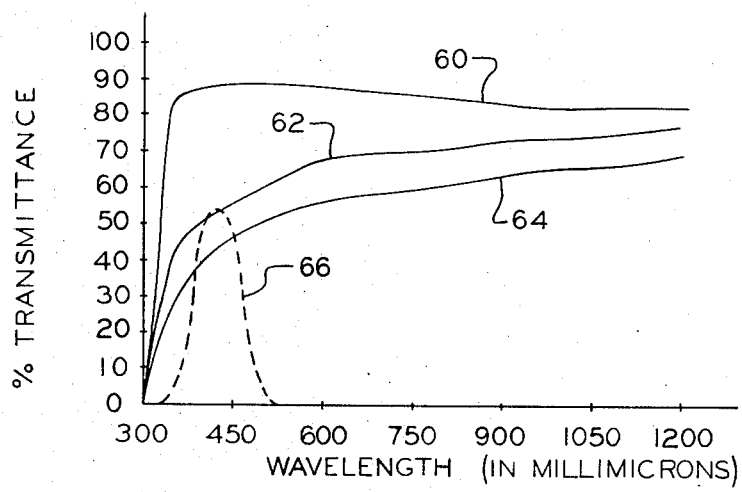
FIG. 3 is a graphical representation of the spectral response of glass with coatings of sodium sulphate of varying thicknesses.

Referring to FIG. 3 there is illustrated graphically the percent of light transmittance through glass with coatings of sodium sulphate of varying thicknesses. The abscissa of the graph in FIG. 3 denotes the wave length of light in millimicrons. The ordinate of the graph in FIG. 3 is divided into units representing the percent of light transmittance. The curve 60 represents the transmittance of a particular glass with no coating thereon. The curve 62 represents the light transmittance of the same type of glass with one side of the glass coated with a predetermined amount of thickness of sodium sulphate. The curve 64 represents the light transmittance of the same type of glass having two sides coated with the same thickness of sodium sulphate. Thus, the curve 64 also represents the two coatings of sodium sulphate that would be sensed on opposite side walls of the inside of the container 10 when the light beam is attempting to pass from the source 14 to the detecting unit 28.

The dotted curve 66 represents the response of the combination filter 22 and utilizes the maximum absorption in the visible range between 0.35 and 0.50 microns for the desired predetermined thickness of the coating on the inside of the bottles. It can thus be seen that filter 22 limits the light falling on the light sensing detector 28 to the range between 0.35 and 0.50 microns, the range of maximum absorption of the sodium sulphate. The gain of the amplifier 30 can be set so that the desired thickness of sodium sulphate can be passed or rejected.

There has thus been disclosed herein apparatus for producing an accept-reject signal for individual items of glassware to detect a surface coating on glassware, the surface coating having a predetermined composition. A radiation energy source is positioned to pass a radiation energy beam through an item of glassware. A pick-up means is positioned to receive the radiation energy beam after the beam passes through the glassware and provide an accept-reject signal in response to radiation energy received from the beam. A filter means is positioned to intercept the radiation energy beam before the beam reaches the pick-up means to filter the radiation energy beam to remove substantially all of the wave lengths of the beam except those wave lengths which will be inhibited in their passage through the glassware by a coating of predetermined composition on the glassware.

There is also disclosed a method for determining the thickness of a surface coating which includes a predetermined composition on an item of glassware. A beam of light is passed through the glassware and the light beam is filtered to pass only a predetermined range of wave lengths, the passage of which wave lengths would be inhibited by the predetermined composition. The filtered light beam has been monitored to determine the amount of light in the range of wave lengths that is passed through the glassware and is a measure of the thickness of the surface coating.

In conclusion, it is pointed out that while the illustrated examples constitute practical embodiments of our invention, we do not limit ourselves to the exact details shown since modification of these details may be made without departing from the spirit and scope of this invention.

We claim:

1. Apparatus for inspecting glass containers to determine if the alkalinity of a layer of high alkali glass on the inside of the container has been neutralized comprising a. means for conveying glass containers through an inspection station from a neutralization process wherein an acidic gas has been exposed to the alkaline glass interior surface of each container for reaction therewith to neutralize the interior surface, a product of the reaction between the acidic gas and the alkaline glass forming a neutral salt which is deposited as a coating of a predetermined thickness on the interior surface of the container when the alkaline glass interior has been effectively neutralized, b. a light source at said inspection station for directing a beam of light through each container conveyed into said station, c. a light sensitive pick-up means at said inspection station for receiving light from said light beam after passage through a container, said pick-up means producing an output signal in response to detection of wave lengths of light not scattered, absorbed or otherwise inhibited in passage through said container by a coating of said neutral salt on the interior surface of said container, said output signal having a magnitude proportional to the amount of light received by said pick-up means from said light source, d. means for filtering light from said light beam before reception by said pick-up means to limit light received by said pick-up means to a range of wave lengths which will be scattered, absorbed or otherwise have their passage inhibited by a coating of said neutral salt on the interior surface of said container, and e. means responsive to a magnitude of said output signal for indicating an unacceptable thickness of said neutral salt on the interior surface of said container.

2. Apparatus as defined in claim 1 in which the neutral salt forming the coating includes sulphates and sulphites, and in which said light filtering means passes the wave lengths between 0.35 and 0.50 microns.

3. Apparatus as defined in claim 1 in which the neutral salt forming the coating includes sodium sulphate and in which said light filtering means passes the wave lengths between 0.35 and 0.50 microns.

4. Apparatus as defined in claim 1 in which said light filtering means includes infrared absoring filter means.

5. Apparatus as defined in claim 1 in which said light filtering means includes blue-passing filter means.

6. Apparatus as defined in claim 1 which further includes
   a. means for detecting the position of said glass containers and providing a gating signal when said interior surfaces are substantially normal to said beam of light, and
   b. means responsive to said gating signal for passing said output signal to said indicating means.

7. A method for producing and inspecting a glass container in which a layer of high alkali glass on the inside of the glass container has been given a neutralizing treatment, comprising the steps of
   a. introducing an acidic compound into the interior of a glass container having a layer of high alkali glass on an interior surface thereof,
   b. heating said container to react said acidic compound with said layer of high alkali glass,
   c. cooling said container,
   d. positioning a light source to direct a beam of light through said interior surface of said container,
   e. filtering said light beam to pass only a range of wave lengths which would be scattered, absorbed or otherwise have their passage inhibited by the presence of a neutral salt coating on said interior surface which should occur as a result of the reaction of said acidic compound with the layer of high alkali glass, and
   f. sensing the filtered light beam on the side of said container opposite from said light source, to determine the amount of light in said range of wave lengths which has passed through said interior surface, as a measure of the effectiveness of the acidic compound in neutralizing the layer of high alkali glass.

8. A method as defined in claim 7 in which the filtering step includes limiting the range of wave lengths to those which are scattered, absorbed or have their passage inhibited by sulphate and sulphite compound coatings.

9. A method as defined in claim 7 in which the filtering step includes limiting the range of wave lengths to 0.35 to 0.50 microns to detect the amount of sodium-sulphate in the coating as a measure of the acidic compound in neutralizing the layer of high alkali glass.

* * * * *